United States Patent
Urard et al.

(10) Patent No.: US 9,647,724 B2
(45) Date of Patent: May 9, 2017

(54) WIRELESS DEVICE PAIRING

(71) Applicants: STMicroelectronics SA, Montrouge (FR); STMicroelectronics (Crolles 2) SAS, Crolles (FR)

(72) Inventors: Pascal Urard, Theys (FR); Christophe Regnier, Bernin (FR); Daniel Gloria, Detrier (FR); Olivier Hinsinger, Barraux (FR); Philippe Cavenel, Barraux (FR); Lionel Balme, Grenoble (FR)

(73) Assignees: STMicroelectronics SA, Montrouge (FR); STMicroeletronics (Crolles 2) SAS, Crolles (FR)

( * ) Notice: Subject to any disclaimer, the term of this patent is extended or adjusted under 35 U.S.C. 154(b) by 478 days.

(21) Appl. No.: 13/714,151

(22) Filed: Dec. 13, 2012

(65) Prior Publication Data

US 2013/0157562 A1 Jun. 20, 2013

(30) Foreign Application Priority Data

Dec. 16, 2011 (FR) ...................................... 11 61855

(51) Int. Cl.
| | | |
|---|---|---|
| H04B 7/00 | (2006.01) | |
| H04B 5/00 | (2006.01) | |
| G06F 21/35 | (2013.01) | |
| H04W 12/06 | (2009.01) | |
| H04W 12/08 | (2009.01) | |
| H04W 4/00 | (2009.01) | |

(52) U.S. Cl.
CPC ........... *H04B 5/0031* (2013.01); *G06F 21/35* (2013.01); *H04W 4/008* (2013.01); *H04W 12/06* (2013.01); *H04W 12/08* (2013.01)

(58) Field of Classification Search
CPC .. H04B 10/0705; H04B 10/85; H04B 5/0031; G06F 21/30; G06F 21/35; H04W 12/00; H04W 12/06; H04W 12/08; H04W 12/12
USPC .................................................. 455/410, 411
See application file for complete search history.

(56) References Cited

U.S. PATENT DOCUMENTS

| | | | |
|---|---|---|---|
| 7,907,901 | B1 | 3/2011 | Kahn et al. |
| 8,260,262 | B2 * | 9/2012 | Ben Ayed ..................... 455/411 |
| 2007/0211573 | A1 | 9/2007 | Hermansson |
| 2007/0213045 | A1 | 9/2007 | Hermansson et al. |
| 2010/0024003 | A1 | 1/2010 | Malledant et al. |
| 2010/0167646 | A1 | 7/2010 | Alameh et al. |
| 2010/0197271 | A1 * | 8/2010 | Yoshikawa et al. .......... 455/411 |
| 2011/0070864 | A1 * | 3/2011 | Karam et al. ................. 455/411 |
| 2011/0258689 | A1 * | 10/2011 | Cohen et al. ..................... 726/7 |
| 2012/0254987 | A1 * | 10/2012 | Ge et al. ......................... 726/19 |

OTHER PUBLICATIONS

Simonite, "Synchronized shaking connects gadgets securely," dated Nov. 13, 2007, http://www.newscientist.com/article/dn12912, 4 pages.

* cited by examiner

*Primary Examiner* — Duc M Nguyen
(74) *Attorney, Agent, or Firm* — Seed IP Law Group LLP

(57) ABSTRACT

A wireless unit includes a first motion sensitive device; communications circuitry for wirelessly communicating with a further wireless unit; and a processing device configured to compare at least one first motion vector received from the first motion sensitive device with at least one second motion vector received from a second motion sensitive device of the further wireless unit.

30 Claims, 3 Drawing Sheets

WIRELESS DEVICE PAIRING

BACKGROUND

Technical Field

The present disclosure relates to a device and method for pairing a device with at least one other device in a network.

Description of the Related Art

FIG. 1 illustrates a wireless network 100, comprising a base unit 102 and a plurality of wireless units 104. Each wireless unit 104 may wirelessly communicate with the base unit 102 and/or with one or more of the other wireless units 104.

Such a network 100 is configured such that each of the wireless units 104 is authorized to fully communicate only with the other devices of the same network 100. In particular, wireless units 106 shown in FIG. 1, which for example form part of a neighboring network that is within the wireless communication range of base unit 102 and/or of one of the wireless units 104, may be permitted to exchange some minimal information with the devices of network 100, by they not authorized to perform high-level exchanges with devices of network 100.

In order to pair a new wireless unit with one or more of the devices of network 100, a process known as "pairing" is used. Once paired, the new device may wirelessly communicate with the other wireless units 104 and/or base unit 102 in the same way and to the same extent as the other wireless units 104. A risk during pairing is that a network intruder manages to have an unauthorized wireless device added to the network. An objective of pairing is therefore that the addition of new wireless devices is restricted to devices that a network operator wishes to be added to the network. Thus any other wireless device, such as units 106 in FIG. 1, should be prevented from being able to pair with network 100.

One solution for preventing unauthorized pairing of new wireless devices would be to use a button on the new wireless device, which can be pressed by a user during the pairing procedure to validate the pairing of this device. However, a determined intruder may be able to breach this security measure, for example by pressing at the appropriate time a similar button on an unauthorized wireless device. Furthermore, such a button adds cost, complexity, and the risk of malfunction to the wireless devices.

There is thus a technical problem in securely pairing new devices in a wireless network such as that of FIG. 1, without permitting unauthorized devices to be paired.

BRIEF SUMMARY

According to one embodiment, there is provided a wireless unit comprising: a first motion sensitive device; communications circuitry for wirelessly communicating with a further wireless unit; and a processing device configured to compare at least one first motion vector received from said first motion sensitive device with at least one second motion vector received from a second motion sensitive device of said further wireless unit.

According to one embodiment, the processing device is further configured to pair, based on said comparison, said further wireless unit with said wireless unit and/or with at least one other device of a network.

According to an embodiment, the processing device is configured to pair said further wireless device by transmitting a message to said further wireless device comprising connection data.

According to an embodiment, the processing device is configured to receive said first motion vector by sampling an output of said first motion sensitive device in response to the reception of said second motion vector.

According to an embodiment, the processing device is further configured to determine a correction vector between one of said first and one of said second motion vectors and to correct a subsequent one of said first and second motion vectors based on said correction vector prior to using it during said comparison.

According to an embodiment, the first and second motion vectors each comprise x, y and z components corresponding to three orthogonal directions, and said comparison comprises determining the difference between the x components of the first and second motion vectors, between the y components of the first and second motion vectors and between the z components of the first and second motion vectors.

According to an embodiment, the motion sensitive devices each comprise an accelerometer, an electronic compass, and/or a gyroscope.

According to an embodiment, there is provided a system comprising the above wireless unit and the further wireless unit.

According to one embodiment, the system further comprises a base unit comprising communications circuitry configured to communicate with said wireless unit and with said further wireless unit.

According to one embodiment, the base unit is an edge router of the wireless network, and the wireless unit is a pairing authorization unit for pairing new wireless devices on said network.

According to an embodiment, there is provided the use of the above wireless unit for pairing the further wireless unit with the wireless unit and/or with at least one other device of a network by moving at the same time and together the wireless unit and the further wireless unit while said at least one first and second motion vectors are generated.

According to an embodiment, there is provided a method comprising: moving at the same time and together a wireless unit and a further wireless unit; while said wireless unit and further wireless unit are being moved, generating motion vectors by respective motion sensitive devices of said wireless unit and further wireless unit; and comparing said motion vectors by a processing device.

According to one embodiment, the method further comprises pairing by said processing device the further wireless unit with the wireless unit and/or with at least one other device of a network based on said comparison.

According to an embodiment, pairing of the further wireless unit by the processing device is performed if N of the first and second motion vectors match to within a certain tolerance, where N is equal to 2 or more.

According to an embodiment, the method comprises sampling a motion vector of the motion sensitive device of the wireless unit in response to the reception by the wireless unit of a motion vector of the motion sensitive device of the further wireless unit.

In an embodiment, a wireless unit, comprises: a motion sensor; a transceiver configured to receive wireless communications; and at least one processing device configured to respond to reception of motion information by the transceiver by sampling an output of the motion sensor and comparing the sampled output with received motion information. In an embodiment, said at least one processing device is further configured to pair, based on said comparison, a second wireless unit from which motion information was received with at least one device. In an embodiment, the at least one device includes at least one of: the wireless unit and another device of a network. In an embodiment, said at least one processing device is configured to pair said second wireless unit by transmitting a message to said second wireless unit including connection data. In an embodiment, the received motion information comprises at least one received motion vector and the sampled output of the motion sensor comprises at least one sampled motion vector. In an embodiment, said processing device is configured to perform the comparison by determining a correction vector between one of said received motion vectors and one of said sampled motion vectors and correcting a subsequent one of said received motion vectors and said sampled motion vectors based on said correction vector prior to using the subsequent motion vector during said comparison. In an embodiment, said motion vectors each comprise x, y and z components corresponding to three orthogonal directions, and wherein the processing device is configured to determine differences between x components of motion vectors, differences between y components of motion vectors and differences between z components of motion vectors. In an embodiment, said motion sensor comprises at least one of: an accelerometer; an electronic compass; and a gyroscope.

In an embodiment, a system comprises: a first wireless device having: a motion sensor; and a transceiver coupled to the motion sensor and configured to transmit motion-related information; and a second wireless device having: a motion sensor; a transceiver configured to receive wireless communications; and at least one processing device configured to respond to reception of motion-related information by the transceiver of the second wireless device by sampling an output of the motion sensor of the second wireless device and comparing the sampled output with received motion-related information. In an embodiment, the system comprises a base unit including communications circuitry configured to communicate with said first wireless device and with said second wireless device. In an embodiment, said base unit is an edge router of a wireless network, and wherein said second wireless device is a pairing authorization module for pairing new wireless devices on said network. In an embodiment, the second wireless device is configured to pair wireless devices on a network based on comparisons by the processing device. In an embodiment, the second wireless device is an edge router of the network.

In an embodiment, a system comprises: means for sensing motion; means for receiving motion-related information; and means for responding to receipt of motion-related information by sampling an output of the means for sensing motion and comparing the sampled output with received motion-related information. In an embodiment, the system comprises: a first wireless device including the means for sensing motion, the means for receiving motion-related information and the means for responding to receipt of motion-related information; and a second wireless device including: second means for sensing motion; and means for transmitting motion-related information generated by the second means for sensing motion. In an embodiment, the means for sensing motion comprises at least one of: an accelerometer; an electronic compass; and a gyroscope.

In an embodiment, a method comprises: receiving, by a wireless communication device, motion-related information; and responding, by the wireless communication device, to the receipt of motion-related information by: generating motion-related information; and comparing generated motion-related information to received motion-related information. In an embodiment, the receiving motion-related information comprises receiving a stream of motion-related information and the comparing comprises comparing generated motion-related information to concurrently received motion-related information. In an embodiment, the wireless communication device is a first wireless communication device, the received motion-related information is received from a second wireless communication device and the method comprises: moving the first and second wireless communication devices together at the same time; and transmitting the received motion-related information from the second wireless communication device to the first wireless communication device. In an embodiment, the method comprises: selectively pairing the second wireless communication device based on the comparison. In an embodiment, the selectively pairing comprises pairing the second wireless communication device with the first wireless communication device.

In an embodiment, a method comprises: moving at the same time and together a first wireless unit and a second wireless unit; and while said first wireless unit and said second wireless unit are being moved, generating and transmitting motion vectors from the first wireless unit to the second wireless unit; and responding, by the second wireless unit, to receipt of transmitted motion vectors by: generating motion vectors related to movement of the second wireless unit; and comparing at least one motion vector received from the first wireless unit to at least one motion vector generated by the second wireless unit. In an embodiment, the method further comprises: selectively pairing, by said second wireless unit and based on the comparing, the first wireless unit with at least one device of a wireless network. In an embodiment, pairing of said first wireless unit is performed if N compared motion vectors match to within a certain tolerance, where N is equal to 2 or more.

In an embodiment, a non-transitory computer-readable memory medium's contents cause a first wireless device to respond to receipt of motion vectors from a second wireless device by performing a method, the method comprising: generating motion vectors in response to receipt of motion vectors; comparing one or more generated motion vectors to one or more received motion vectors; and selectively pairing the second wireless device based on the comparing. In an embodiment, the selectively pairing comprises pairing the second wireless device if N compared motion vectors match to within a certain tolerance, where N is equal to 2 or more. In an embodiment, the comparing comprises adjusting a motion vector and comparing the adjusted motion vector to another motion vector.

BRIEF DESCRIPTION OF THE SEVERAL VIEWS OF THE DRAWINGS

The foregoing and other purposes, features, aspects and advantages of various embodiments will become apparent from the following detailed description of embodiments, given by way of illustration and not limitation with reference to the accompanying drawings, in which.

DETAILED DESCRIPTION

Figure 1:
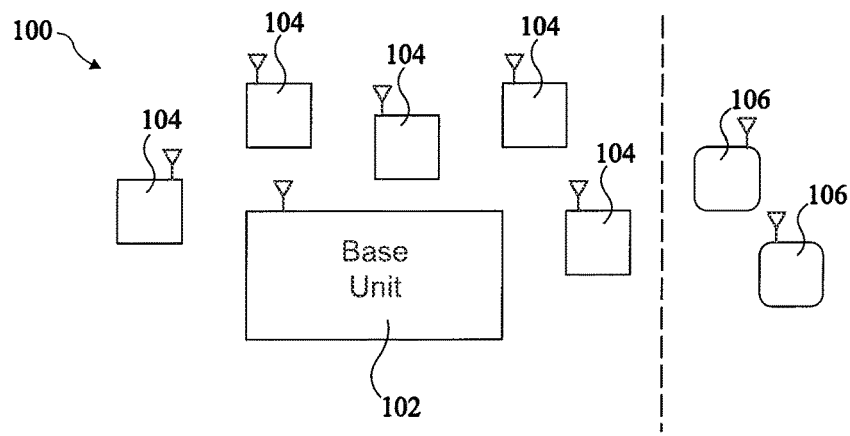
FIG. 1 (described above) illustrates a network of wireless units according to one example.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, wireless devices, computing systems, virtual computing systems, communication networks, routers, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claims.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Throughout the following description, only those aspects useful for an understanding of the present disclosure will be described in detail. Other aspects, such as the particular wireless protocol used for the RF (radio frequency) communications between wireless units of the network and the particular applications of the wireless units of the network are not discussed in detail, the embodiments being compatible with a broad range of wireless protocols and types of wired and/or wireless networks. For example, communications could be by any of a number of wireless protocols conforming to the IEEE 802.15.4 standard for low-rate wireless personal area networks (LR WPLANs), such as for example Zigbee or WirelessHART (the names "Zigbee" and "WirelessHART" may correspond to registered trademarks). Examples of applications of the wireless units of the network include networks of sensors and/or actuators forming fire or burglar alarm systems, systems for monitoring large structures or industrial machines, wireless body area networks (WPANs) or body sensor networks (BSN), computer gaming applications, or a wide range of other types of systems.

Throughout the following, the terms "wireless unit" and "wireless device" are used to designate a unit that is capable of wireless communication with one or more other devices in the network. Such wireless units may be, for example, mobile, in that they have either an autonomous power source, for example in the form of a rechargeable battery, or they could be powered by radio energy received from certain devices inside or outside the network. However, it will be apparent to those skilled in the art that the embodiments described herein could also be applied to wireless units that, in addition to wireless communications, are also capable of wired communication, such as elements of a power line communications (PLC) systems, which may be powered by a wired power supply at least some of the time.

The terms "pair" or its variants are used to designate a process according to which at least some types of communication exchanges between a certain network device and one or more other devices in the network, which were previously not permitted, become authorized. For example, this authorization is granted by transmitting connection data, such as a network identifier, to the new device, and/or by adding an address of the new device to a list of authorized devices on the network.

Figure 2:
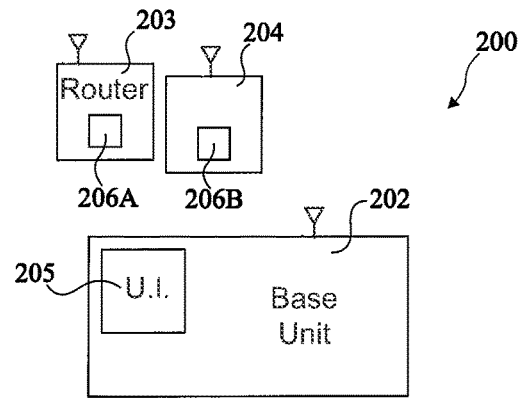
FIG. 2 illustrates a network of wireless units according to an example embodiment of the present disclosure.

FIG. 2 illustrates a system 200 of wireless units according to an example embodiment.

System 200 for example comprises a network formed of a base unit 202, and a wireless unit 203 already paired to the base unit. Wireless unit 203 may thus be considered as a trusted wireless unit. There may be one or more further wireless units (not illustrated in FIG. 2) forming the network. In one example, the wireless unit 203 is an edge router. An edge router is a wireless unit that performs the principal interface between the other wireless units of the network and the base unit 202. Furthermore, according to the embodiments described herein, the device 203 is able to act as a pairing authorization module for enabling new devices to be paired on the network.

The base unit 202 for example comprises a user interface 205, comprising an input device and/or display, permitting an operator of the network to interact with the wireless unit 203 and/or other paired wireless units of the network. In some embodiments, the base unit 202 could be incorporated into a mobile communications device of a user, such as a smart phone, PDA (personal digital assistant), tablet or laptop computer, or the like. Furthermore, the base unit 202 could be integral with the wireless unit 203. As a further alternative, the edge router functionalities of wireless unit 203 could be incorporated into the base unit 202, and the wireless unit 203 could be a pre-paired device that is used for the purpose of pairing new wireless devices.

System 200 also comprises an unpaired wireless unit 204, which is to be added to the network, such that it may communicate with the other devices 202, 203 of the network.

One solution for pairing the wireless unit 204 with one or more devices of the network would be to use a low power communication signal between devices 203 and 204. However, there would still be some risk that the low power signal could be intercepted by monitoring equipment of an intruder wishing to access the network.

An alternative solution that uses motion detection will now be described.

The wireless units 203, 204 comprise motion sensitive devices 206A, 206B respectively. The term "motion sensitive device" is used herein to designate any of a range of detectors that are sensitive to some form of physical movement to which they are subjected. In particular, the motion that is detected is the motion of the wireless device comprising the motion sensitive device. In the example of FIG. 2, the motion sensitive devices 206A, 206B may be accelerometers. In alternative embodiments, other sensors capable of periodically providing a signal indicating the movement of the sensor could be used, such as MEM (Microelectromechanical) gyroscopes or MEM compasses. For example, a MEM compass is an electronic compass comprising a magnetometer and/or a fiber optic gyrocompass.

In operation, the motion sensitive devices 206A, 206B of the wireless units 203, 204 are for example used during the pairing procedure of the new unit 204 in order to prevent non-authorized devices from being added to the network. This may be achieved by moving together and at the same time the devices, and comparing the motion vectors generated by the motion sensitive devices 206A, 206B. If the motion vectors match within a certain tolerance, the new unit is considered to be authorized to pair with the network, whereas if the motion vectors do not match, pairing is not performed and may be actively prevented. The procedure according to an embodiment will now be described in more detail with reference to FIG. 3.

Figure 3:
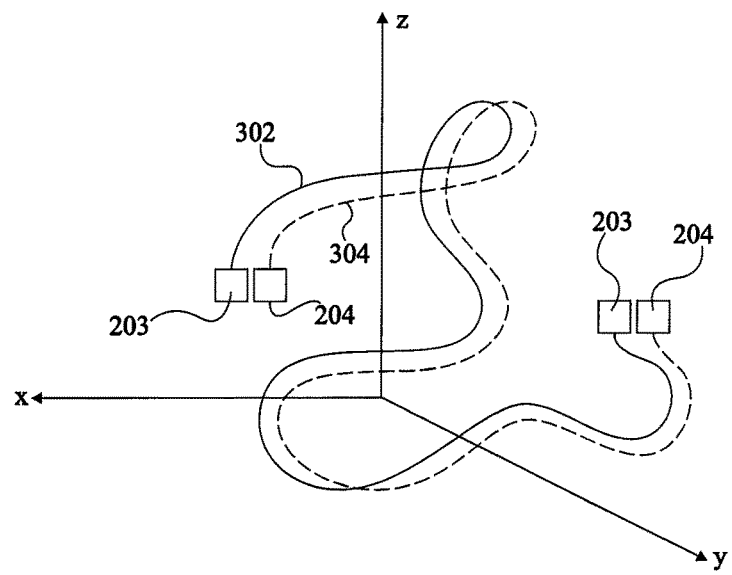
FIG. 3 is a graph illustrating motion vectors according to an example embodiment of the present disclosure.

FIG. 3 is a graph illustrating an example of the three-dimensional motion vectors of the units 203 and 204 generated by the respective motion sensitive devices 206A, 206B during the pairing procedure. It should be noted that the motion vectors of FIG. 3 may represent the physical displacement of the units 203, 204 along the orthogonal x, y, and z axes, the acceleration of the units along these axes, or the orientation of the units along these axes, depending on the type of motion sensitive device 206A, 206B.

The units 203 and 204 are for example placed next to each other and in physical contact with each other, and moved for a few seconds in unison. For example, both of the units are held in the user's hand and moved. Alternatively, they could be placed in a bag and moved. In any case, essentially the same movement is applied to both units 203, 204 at the same time. A series of motion vectors 302 represented by a solid line in FIG. 3 correspond to the detected motion of unit 203, while a series of motion vectors 304 represented by a dashed line in FIG. 3 correspond to the detected motion of unit 204. The motion vectors are for example compared for a fixed period of time, for example over a time duration of a few seconds. Within this time duration, hundreds of thousands of motion vectors are for example compared, and the periodicity of these motion vectors of each sequence 302, 304 is for example in the range of 1 to 20 ms, although other periods between motion vectors could be used. The vectors 302 and 304 are relatively similar, due to the fact that the units are moved together, and by comparing some or all of the corresponding motion vectors, a match can be detected.

Figure 4:
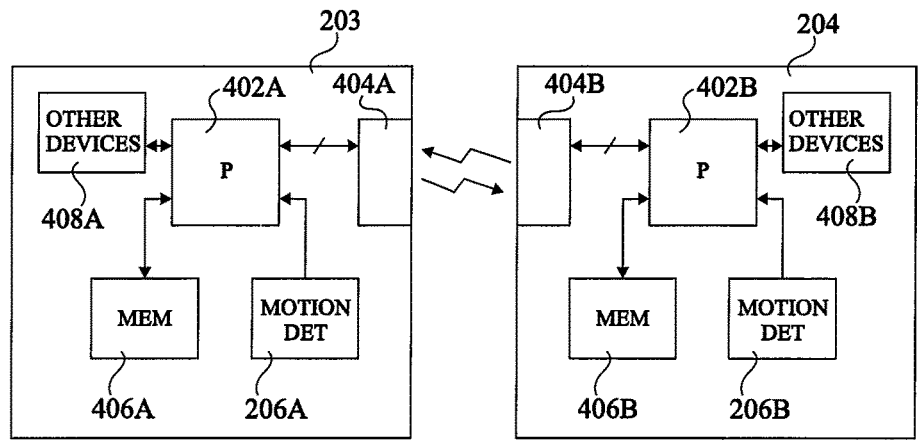
FIG. 4 schematically illustrates a pair of wireless units according to an example embodiment of the present disclosure.

FIG. 4 illustrates the wireless units 203 and 204 of FIG. 2 in more detail, according to an example embodiment.

Wireless units 203, 204 for example each comprise a processing device 402A, 402B respectively, in communication with the corresponding motion detection devices 206A, 206B and with corresponding wireless communications circuitry 404A, 404B. The processing devices 402A, 402B are also in communication with memories 406A, 406B respectively. One or more further devices 408A, 408B may be provided in units 203, 204 respectively, which for example comprise further sensors and/or actuators.

During the pairing procedure, the power of the communication signals between the devices is for example kept relatively low, in order to reduce the risk that unauthorized devices could intercept these communications.

Figure 5:
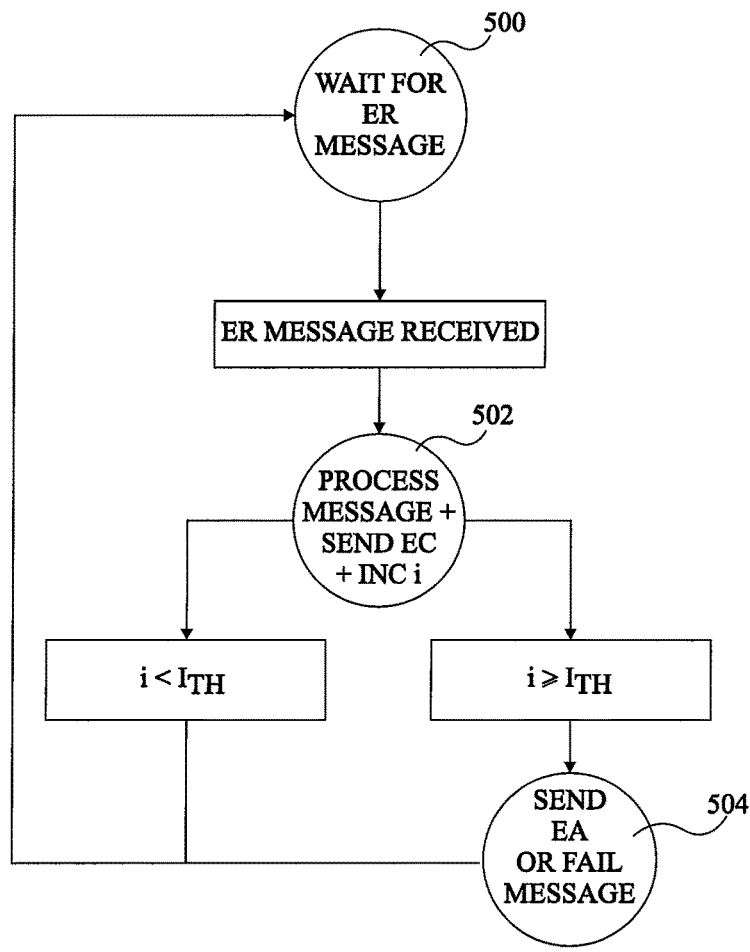
FIG. 5 is a state diagram illustrating states of an edge router according to an example embodiment of the present disclosure.

FIG. 5 is a state diagram illustrating states of the wireless unit 203 of FIG. 4 according to an example embodiment in which unit 203 forms an edge router of the network.

In an initial state 500, wireless unit 203 for example waits for an edge router (ER) message, which is a message intended for unit 203 transmitted by an unpaired wireless unit. Initially, such a message is interpreted as a request to be paired.

The transition to a subsequent state 502 occurs when an ER message is received. In state 502, the ER message is processed and an edge contact (EC) message is sent to the unpaired device. This EC message indicates that the edge router is ready to receive a motion vector from the unpaired device. Furthermore, a count value i, which is initially at zero, is incremented.

The transition from state 502 either back to the initial state 500 or to a new state 504 is determined by the value of the count value i. In particular, if the count value i is less than a threshold value $I_{TH}$, the state transition is to the initial state 500. Alternatively, if the count value i is greater than or equal to the threshold value $I_{TH}$, the next state is state 504.

Assuming that in state 502 the count value i is lower than the threshold value $I_{TH}$, the initial state 500 is returned to, in which a new ER message is awaited. The next ER message to be received will contain one or more motion vectors sampled by the unpaired wireless unit. Thus the value of the threshold value $I_{TH}$ for example determines how many motion vectors are received before state 504 is entered. The threshold value $I_{TH}$ is for example equal to or greater than 2, and could be as high as several thousand.

If, after entering state 502, the threshold count value $I_{TH}$ is reached, state 504 is entered, in which either an edge attach (EA) message or a fail message is transmitted to the unpaired device. The EA message is for example a connection message sent to the unpaired device that provides connection data, such as a network identifier, enabling the unpaired device to pair with one or more devices on the network. The fail message for example informs the user that pairing has failed, and may be transmitted to the unpaired device 204 and/or to the base unit 202.

Figure 6:
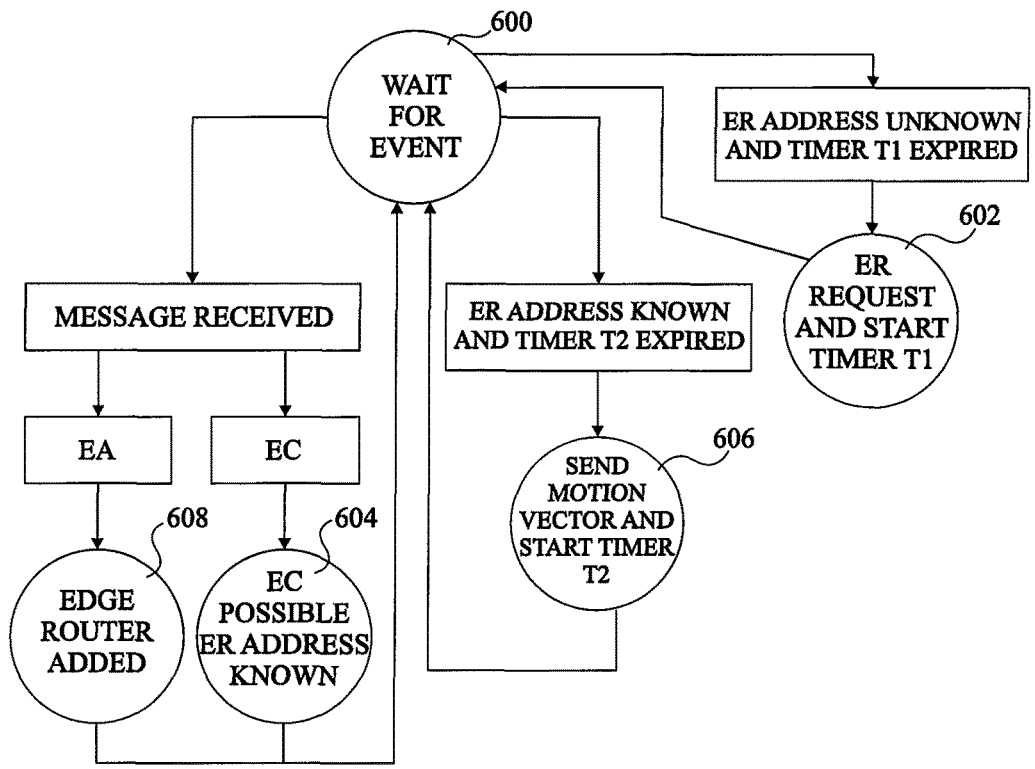
FIG. 6 is a state diagram illustrating states of an unpaired wireless device according to an example embodiment of the present disclosure.

FIG. 6 is a state diagram showing states of the unpaired wireless unit 204 according to an example embodiment.

In an initial state 600, an event is waited for, which could be the reception of a message, or the expiration of a timer.

In particular, the transition to a new state 602 occurs if a condition is met, which is that an edge router address is unknown, and that a timer t1 has expired. Initially, when an unpaired wireless unit is introduced within range of the edge router, the edge router address is not known, and because timer T1 is not running, it is considered to be expired. Thus initially the above condition will be considered as being met, and a transition from state 600 to state 602 occurs. In state 602, an edge router ER message is transmitted. This message corresponds to the message received in state 500 of FIG. 5. Furthermore, the timer T1 is started.

After state 602, the initial state 600 is re-entered, and if there is no response before timer T1 has expired, state 602 is again entered, and a new ER message is transmitted. Alternatively, if an edge connect (EC) message is received from the edge router, the state 604 is entered. The edge connect message corresponds to the one sent during state 502 of FIG. 5. In state 604, it is determined that edge connection is possible with the edge router, and the address of the edge router is stored. After state 604, there is a transition back to state 600.

Once the edge router address is known, a transition from state 600 to a state 606 occurs once a timer T2 has expired. Initially, because timer T2 is not running, is it considered to be expired, and thus state 606 is entered.

In state 606, a motion vector is sampled and sent to the edge router, and the timer T2 is started. Then, the initial state 600 is re-entered, with timer T2 running. When timer T2 expires, state 606 is re-entered, and another motion vector is transmitted to the edge router. This cycle continues until an edge attach (EA) message is received from the edge router, which causes the transition from state 600 to a state 608. In state 608 the edge router is for example added as a known element of the network to which communications may be transmitted. The EA message for example contains a network identifier to be used for future network communications. To provide additional security, the address, such as the IP address, of the unpaired device 204 is also for example stored by the network manager, i.e., by the base unit 202 and/or by the wireless unit 203. This for example prevents an intruder device that knows the network identifier from communicating in the network.

Figure 7:
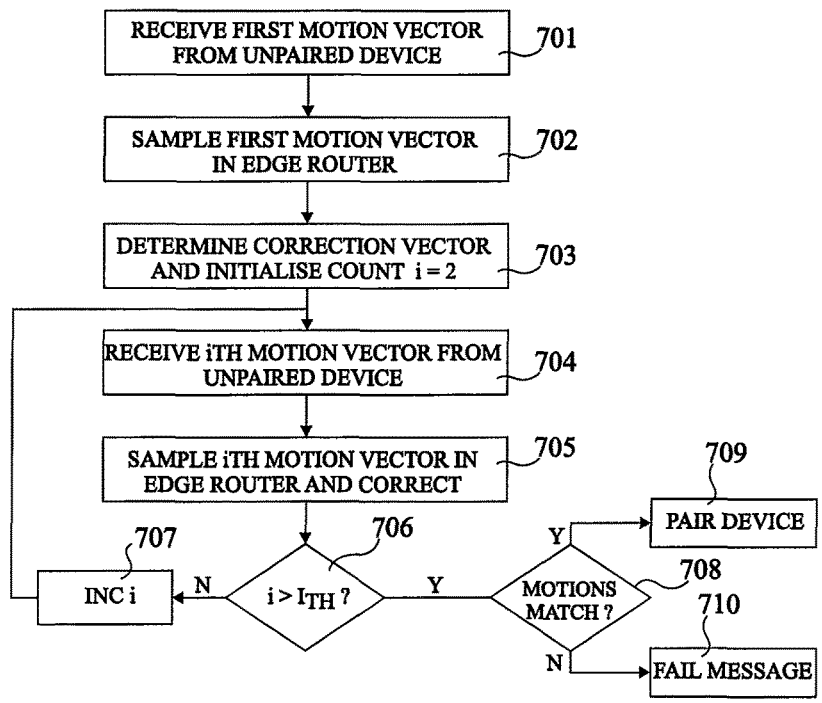
FIG. 7 is a flow diagram illustrating operations in a method of device pairing according to an example embodiment of the present disclosure.

FIG. 7 is a flow diagram showing operations in a method of device pairing according to an example embodiment, which is for example implemented by a processing device of the wireless unit 203 of FIG. 2.

In a first operation 701, the wireless unit 203 receives an initial motion vector from the unpaired wireless unit 204.

In a next operation 702, an initial motion vector is sampled by the wireless unit 203. In particular, the reception of a first motion vector from an unpaired device for example triggers the sampling of a motion vector from the motion sensitive device 206A of the wireless unit 203.

In a subsequent operation 703, a correction vector is determined between the initial motion vectors received from the wireless unit 203 and unpaired wireless unit 204. For example, this is achieved by performing the following subtraction:

$$\begin{pmatrix} C_x \\ C_y \\ C_z \end{pmatrix} = \begin{pmatrix} A_x \\ A_y \\ A_z \end{pmatrix} - \begin{pmatrix} B_x \\ B_y \\ B_z \end{pmatrix}$$

where the values $C_x$, $C_y$ and $C_z$ are the x, y and z components of the correction vector, the values $A_x$, $A_y$ and $A_z$ are the x, y and z components of the initial motion vector from the wireless unit 203, and the values $B_x$, $B_y$ and $B_z$ are the x, y and z components of the initial motion vector of the unpaired wireless unit 204. This correction vector is for example subtracted from future motion vectors generated by the motion sensitive device of the wireless unit 203. Also in operation 703, the count value i is for example initialized at 2.

In a subsequent operation 704, the ith motion vector $B_i$ from the unpaired device 204 is received, and in a subsequent operation 705, the ith motion vector $A_i$ from the motion sensitive device of the wireless unit 203 is sampled, and the correction vector is for example applied to this motion vector. In particular, the corrected vector $A_i'$ is for example determined as follows:

$$\begin{pmatrix} A_{ix}' \\ A_{iy}' \\ A_{iz}' \end{pmatrix} = \begin{pmatrix} A_{ix} \\ A_{iy} \\ A_{iz} \end{pmatrix} - \begin{pmatrix} C_x \\ C_y \\ C_z \end{pmatrix}$$

In a subsequent operation 706, it is determined whether or not the count value i is greater than the threshold value $I_{TH}$. If not, count value i is incremented in an operation 707, and operations 704 and 705 are repeated. If on the other hand the threshold counter value $I_{TH}$ has been reached, the next step is operation 708, in which it is determined whether or not the motion vectors match. For example, it is determined whether, after correction, the motion vectors are identical within a certain tolerance. The tolerance is for example based on the accuracy of the motion detectors, and also the relative sample times of the motion vectors, which may not be at exactly the same time. For example, a tolerance of a few percent of the total range of each vector component may be permitted. For example, this operation involves the calculation of a difference vector using the following operation:

$$\begin{pmatrix} D_x \\ D_y \\ D_z \end{pmatrix} = \left| \begin{pmatrix} A_{ix}' \\ A_{iy}' \\ A_{iz}' \end{pmatrix} - \begin{pmatrix} B_{ix} \\ B_{iy} \\ B_{iz} \end{pmatrix} \right|$$

where the values $D_x$, $D_y$ and $D_z$ are the x, y and z components of a difference vector between the corrected vector $A_i'$ and the received vector $B_i$. For example, each of the components $D_x$, $D_y$ and $D_z$ of the difference vector is compared to a maximum threshold value, and if this maximum threshold is not exceeded for any of the components, the vectors are considered to match. This operation is for example repeated for all of the pairs of vectors from the wireless unit 203 and unpaired wireless unit 204.

If the operation 708 results in a positive match, the next operation is 709, in which the devices are paired. Alternatively, the next operation is 710, in which an error or fail message is for example transmitted to the base unit 202 and/or to the unpaired device 204.

An advantage of the embodiments described herein is that pairing between two wireless devices can be performed in a simple but very secure manner. In particular, it would be very hard for a fraudster to generate motion vectors that match those of the trusted wireless unit 203 within a relatively small time delay.

Having thus described at least one illustrative embodiment, various alterations, modifications and improvements will readily occur to those skilled in the art.

For example, it will be apparent to those skilled in the art that the verification of the motion detectors may be performed in either the trusted wireless unit 203 or in the wireless base unit 202, depending on the implementation.

An advantage of performing this verification within the same device as the motion sensitive device of the trusted wireless unit is that the motion vectors from this device may not be wirelessly transmitted, thereby improving security.

Furthermore, it will be apparent to those skilled in the art that the comparison between motion vectors as well as the correction of motion vectors and the control of the sampling times of the motion vectors, can be implemented by hardware and/or at least partially by software.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems, circuitry and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), state machines, complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wireless unit, comprising:
a motion sensor;
a transceiver configured to receive wireless communications; and
at least one processing device configured to respond to reception of motion information by the transceiver by sampling an output of the motion sensor and comparing the sampled output with received motion information, wherein the received motion information comprises at least one received motion vector having x, y and z components corresponding to three orthogonal directions and the sampled output of the motion sensor comprises at least one sampled motion vector having x, y and z components corresponding to three orthogonal directions, and said processing device is configured to perform the comparison by determining a correction vector between one of said received motion vectors and one of said sampled motion vectors and correcting a subsequent one of said received motion vectors and said sampled motion vectors based on said correction vector prior to using the subsequent motion vector during said comparison.

2. The wireless unit of claim 1 wherein said at least one processing device is further configured to pair, based on said comparison, a second wireless unit from which motion information was received with at least one device.

3. The wireless unit of claim 2 wherein the at least one device includes at least one of: the wireless unit and another device of a network.

4. The wireless unit of claim 3 wherein said at least one processing device is configured to pair said second wireless unit by transmitting a message to said second wireless unit including connection data.

5. The wireless unit of claim 1 wherein the processing device is configured to determine differences between x components of motion vectors, differences between y components of motion vectors and differences between z components of motion vectors.

6. The wireless unit of claim 1, wherein said motion sensor comprises at least one of:
an accelerometer;
an electronic compass; and
a gyroscope.

7. A wireless unit, comprising:
a motion sensor;
a transceiver configured to receive wireless communications; and
at least one processing device configured to respond to reception of motion information by the transceiver by sampling an output of the motion sensor and comparing the sampled output with received motion information, wherein the received motion information comprises at least one received motion vector having x, y and z components corresponding to three orthogonal directions, the sampled output of the motion sensor comprises at least one sampled motion vector having x, y and z components corresponding to three orthogonal directions, and said at least one processing device is configured to perform the comparison by determining a difference vector between one of said received motion vectors and one of said sampled motion vectors and a to correct a subsequent one of said received motion vectors and said sampled motion vectors by subtracting the difference vector from the subsequent vector.

8. The wireless unit of claim 7 wherein said at least one processing device is further configured to pair, based on said comparison, a second wireless unit from which motion information was received with at least one device.

9. A system comprising:
a first wireless device having:
a motion sensor; and
a transceiver coupled to the motion sensor and configured to transmit motion-related information; and
a second wireless device having:
a motion sensor;
a transceiver configured to receive wireless communications; and
at least one processing device configured to respond to reception of motion-related information by the transceiver of the second wireless device by sampling an output of the motion sensor of the second wireless device and comparing the sampled output with received motion-related information, wherein the received motion-related information comprises at least one received motion vector having x, y and z components corresponding to three orthogonal directions and the sampled output of the motion sensor of the second wireless device comprises at least one sampled motion vector having x, y and z components corresponding to three orthogonal directions, and said processing device is configured to perform the comparison by determining a correction vector between one of said received motion vectors and one of said sampled motion vectors and correcting a subsequent motion vector based on said correction vector prior to using the subsequent motion vector during a comparison.

10. The system of claim 9, comprising a base unit including communications circuitry configured to communicate with said first wireless device and with said second wireless device.

11. The system of claim 10 wherein said base unit is an edge router of a wireless network, and wherein said second wireless device is a pairing authorization module for pairing new wireless devices on said network.

12. The system of claim 9 wherein the second wireless device is configured to pair wireless devices on a network based on comparisons by the processing device.

13. The system of claim 12 wherein the second wireless device is an edge router of the network.

14. The system of claim 9 wherein said determining the correction vector comprises determining a difference vector between one of said received motion vectors and one of said sampled motion vectors and correcting the subsequent motion vector comprises subtracting the difference vector from the subsequent motion vector.

15. A system, comprising:
means for sensing motion;
means for receiving motion-related information; and
means for responding to receipt of motion-related information by sampling an output of the means for sensing motion and comparing the sampled output with received motion-related information, wherein the received motion-related information comprises at least one received motion vector having x, y and z components corresponding to three orthogonal directions and the sampled output of the means for sensing motion comprises at least one sampled motion vector having x, y and z components corresponding to three orthogonal directions, and the comparing includes determining a correction vector between one of said received motion vectors and one of said sampled motion vectors and correcting a subsequent one of said received motion vectors and said sampled motion vectors based on said correction vector prior to using the subsequent motion vector during said comparison.

16. The system of claim 15, comprising:
a first wireless device including the means for sensing motion, the means for receiving motion-related information and the means for responding to receipt of motion-related information; and
a second wireless device including:
second means for sensing motion; and
means for transmitting motion-related information generated by the second means for sensing motion.

17. The system of claim 15 wherein the means for sensing motion comprises at least one of:
an accelerometer;
an electronic compass; and
a gyroscope.

18. A method, comprising:
receiving, by a wireless communication device, motion-related information; and
responding, by the wireless communication device, to the receipt of motion-related information by:
generating motion-related information; and
comparing generated motion-related information to received motion-related information, wherein the received motion-related information comprises at least one received motion vector having x, y and z components corresponding to three orthogonal directions and the generated motion-related information comprises at least one generated motion vector having x, y and z components corresponding to three orthogonal directions, and said comparing comprises determining a correction vector between one of said received motion vectors and one of said generated motion vectors and correcting a subsequent motion vector based on the correction vector prior to using the subsequent motion vector during a comparison.

19. The method of claim 18 wherein the receiving motion-related information comprises receiving a stream of motion-related information and the comparing comprises comparing generated motion-related information to concurrently received motion-related information.

20. The method of claim 18 wherein the wireless communication device is a first wireless communication device, the received motion-related information is received from a second wireless communication device and the method comprises:
moving the first and second wireless communication devices together at the same time; and
transmitting the received motion-related information from the second wireless communication device to the first wireless communication device.

21. The method of claim 20, comprising:
selectively pairing the second wireless communication device based on the comparison.

22. The method of claim 21 wherein the selectively pairing comprises pairing the second wireless communication device with the first wireless communication device.

23. The method of claim 18 wherein said determining the correction vector comprises determining a difference vector between one of said received motion vectors and one of said generated motion vectors and correcting the subsequent motion vector comprises subtracting the difference vector from the subsequent motion vector.

24. A method comprising:
moving at the same time and together a first wireless unit and a second wireless unit; and
while said first wireless unit and said second wireless unit are being moved,
generating and transmitting motion vectors from the first wireless unit to the second wireless unit, the transmitted motion vectors having x, y and z components corresponding to three orthogonal directions; and
responding, by the second wireless unit, to receipt of transmitted motion vectors by:
generating motion vectors having x, y and z components corresponding to three orthogonal directions related to movement of the second wireless unit; and
comparing at least one motion vector received from the first wireless unit to at least one motion vector generated by the second wireless unit, the comparing including determining a correction vector between one of said motion vectors received from the first wireless unit and one of said motion vectors generated by the second wireless unit and correcting a subsequent motion vector based on the correction vector prior to using the subsequent motion vector during a comparison.

25. The method of claim 24, further comprising:

selectively pairing, by said second wireless unit and based on the comparing, the first wireless unit with at least one device of a wireless network.

26. The method of claim 25, wherein pairing of said first wireless unit is performed if N compared motion vectors match to within a certain tolerance, where N is equal to 2 or more.

27. The method of claim 24 wherein said determining the correction vector comprises determining a difference vector between one of said motion vectors received from the first wireless unit and one of said motion vectors generated by the second wireless unit and the correcting the subsequent motion vector comprises subtracting the difference vector from the subsequent motion vector.

28. A non-transitory computer-readable memory medium whose contents cause a first wireless device to respond to receipt of motion vectors from a second wireless device by performing a method, the method comprising:

generating motion vectors in response to receipt of motion vectors, the generated and received motion vectors having x, y and z components corresponding to three orthogonal directions;

comparing one or more generated motion vectors to one or more received motion vectors, the comparing including determining a correction vector between one of said received motion vectors and one of said generated motion vectors and correcting a subsequent one of said received motion vectors and said generated motion vectors based on said correction vector prior to using the subsequent motion vector during said comparison; and selectively pairing the second wireless device based on the comparing.

29. The computer-readable medium of claim 28 wherein the selectively pairing comprises pairing the second wireless device if N compared motion vectors match to within a certain tolerance, where N is equal to 2 or more.

30. The computer-readable medium of claim 28 wherein the determining the correction vector comprises determining a difference vector between one of said received motion vectors and one of said generated motion vectors and the correcting the subsequent motion vector comprises subtracting the difference vector from the subsequent motion vector.

* * * * *

UNITED STATES PATENT AND TRADEMARK OFFICE
CERTIFICATE OF CORRECTION

| | | |
|---|---|---|
| PATENT NO. | : 9,647,724 B2 | Page 1 of 1 |
| APPLICATION NO. | : 13/714151 | |
| DATED | : May 9, 2017 | |
| INVENTOR(S) | : Pascal Urard et al. | |

It is certified that error appears in the above-identified patent and that said Letters Patent is hereby corrected as shown below:

In the Specification

Column 12, Lines 41-43:
"between one of said received motion vectors and one of said sampled motion vectors and a to correct" should read, --between one of said received motion vectors and one of said sampled motion vectors and to correct--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*